Figure 1:
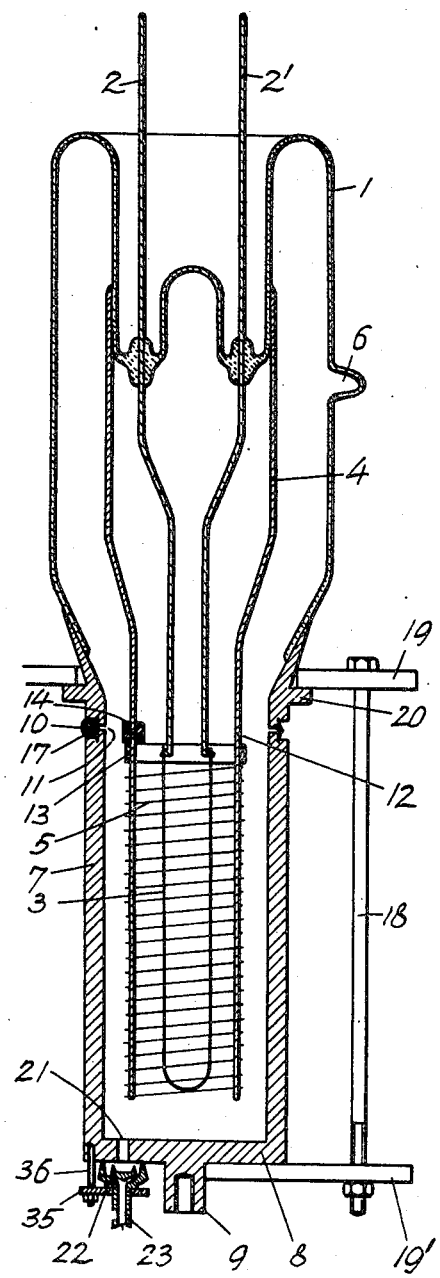

Oct. 26, 1948.   J. STIVÍN   2,452,401
METHOD OF REGENERATION OF ELECTRON DISCHARGE DEVICES
Filed July 3, 1947   2 Sheets-Sheet 1

Oct. 26, 1948.                J. STIVÍN                2,452,401
       METHOD OF REGENERATION OF ELECTRON DISCHARGE DEVICES
Filed July 3, 1947                              2 Sheets-Sheet 2

Patented Oct. 26, 1948

2,452,401

UNITED STATES PATENT OFFICE 2,452,401

METHOD OF REGENERATION OF ELECTRON DISCHARGE DEVICES

Jiří Stivín, Rychnov, Czechoslovakia

Application July 3, 1947, Serial No. 758,857
In Czechoslovakia August 5, 1946

7 Claims. (Cl. 316—2)

The present invention relates to a method of regeneration of electron discharge devices with a metallic portion such as a metal anode.

Large size electron discharge devices with a metal anode, such as emitting discharge devices, are usually evacuated by means of a glass tube, connected with a vacuum pump, said tube being fused on to a glass portion of the bulb and after evacuation of the discharge device is severed e. g. by melting or cutting off by flame. After a certain time of operation the filament of the discharge device is consumed and the latter has then either to be withdrawn from operation at all or to be regenerated or repaired in a suitable way. Such a regeneration is, however, connected with considerable difficulties and is carried out in exceptional cases only.

To this end a glass portion of the discharge device is usually cut away so as to gain access to the filament and after the repair or replacement of the consumed filament by a new one has been carried out, the cut-away portion of the discharge device is again fused in. In this operation it is also necessary to provide a new evacuating tube. In both cases it is necessary to connect together pieces of glass which are of different age and have undergone different heat treatment or even different kinds of glass; this causes considerable difficulties which not only make the fusing operation difficult but endanger also its quality. Even in case that such a fusing operation is successful the fused part cannot be properly heat-treated or tempered because in carrying out a tempering operation with a discharge device not yet evacuated the inner system of the discharge device would be oxidised; if the heat treatment was carried out during the evacuation, the glass parts of the discharge device would be deformed by the influence of atmospheric pressure, because at the tempering temperature, which lies in the neighbourhood of the temperature of glass transformation, the glass is already in a considerably soft state.

All these difficulties result very often in a breakage of the glass portion when large discharge devices are regenerated and even if in some cases the regeneration succeeds it is impossible to carry it out reliably on a larger scale or in series.

All the above drawbacks are removed according to the invention which consists substantially therein that in the process of regenerating a discharge device with a metal anode, the glass portion of the discharge device is in no way affected or cut, the discharge device being opened in a suitable way in the metallic portion by a severing operation e. g. by cutting on a lathe or milling machine or by grinding, so as to make accessible the inner system of the discharge device. In order to uncover the filament the grid is taken off or its carriers may be carefully cut or ground away. The filament may then be easily repaired or replaced by a new one. If the carriers of the grid have been severed during the dismantling of the discharge device they may be connected by suitable joints made of appropriate material, such as molybdenum or may be arc-welded. The cutaway portion of the anode is then placed back to the original place and the connection of the two parts of the anode sealed e. g. by a method disclosed in Ser. No. 730,827 i. e. a sealing ring made of hard material is interposed between the two portions of the anode, said sealing ring having sealing edges, which upon pressing the two parts of the metal anode against each other, penetrate into the metal, ensuring thus a perfect seal of the connection. For this purpose both parts of the metal anode may be clamped together in a suitable way, e. g. by the use of clamping screws. The evacuation of a discharge device repaired in this way may be carried out e. g. in a manner, and with the employment of a device, according to the above mentioned patent i. e. an evacuating aperture is drilled into the cut-away portion of the anode (this operation may be carried out as long as the discharge device is still dismantled) and a bell is applied over the aperture after the discharge device has been assembled, said bell being connected to the evacuating tube and provided on its underside, by which it is applied to the wall of the vessel to be evacuated, with two annular knife edges, of which one is arranged inside the other and the outer knife edge extends slightly over the inner one, the annualr space between the two knife edges being connected with the bore of the evacuating tube. The bell is at first depressed by the outer knife edge into the wall of the cut-away portion of the anode, whereafter the repaired discharge device is evacuated and after this operation is completed the central part of the bell is pressed against the wall of the anode of the evacuated discharge device, so as to make the inner knife edge penetrate into this wall to form a perfectly tight seal of the said aperture.

The evacuating tube is then severed and the space between the knife edges filled with tin, solder or other low melting metal or other material, if so desired. In the same way the connected parts of the cut-up anode may be covered with material poured in, so as to connect the two portions mechanically while relieving of load the sealing ring; the clamping screws may then be removed and the discharge device is again ready for operation.

Figure 2:
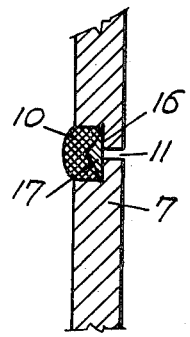
Figure 3:
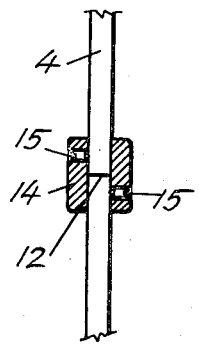
Figure 4:
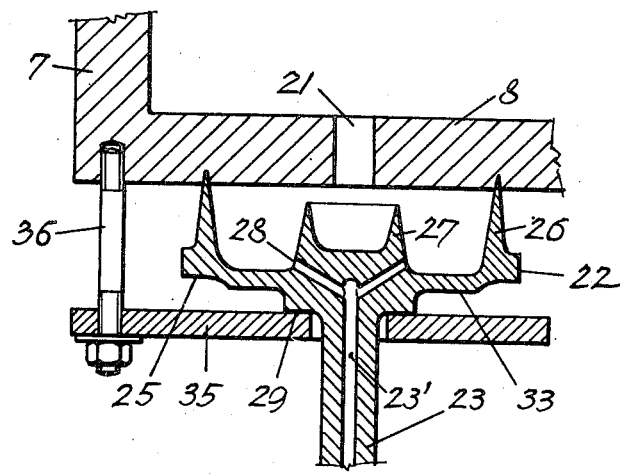

An example of carrying out the reparation of a discharge device with a metal anode by the method according to the invention is shown in the accompanying drawings, wherein Fig. 1 shows a longitudinal section through a regenerated discharge device, Fig. 2 shows in cross-section on a larger scale a detail of sealing the cut-up anode, Fig. 3 represents on a larger scale a detail of connection of a severed grid carrier and Fig. 4 shows the attachment of the evacuating tube.

The discharge device consists of a glass part 1 in which flanges 2 and 2' are fused in, said flanges serving also as carriers of a filament 3. The glass portion 1 of the discharge device is provided with carriers 4, on which a grid 5 is wound, the terminal of the grid being not shown in the drawing. 6 represents the original evacuating tube, molten away. The glass portion 1 of the discharge device is connected with a metal anode 7, said anode consisting substantially of a cylindrical jacket and bottom 8, provided in its centre with a projection 9 with inner thread for securing the discharge device in a cooling water jacket.

If the discharge device has to be regenerated, its metal anode 7 is severed e. g. by grinding or cutting on a lathe or milling machine. A gap 10 is thus produced which allows the glass part 1 to be withdrawn together with a portion of the anode connected therewith and with the inner system of the discharge device. The grid 5 may then be removed or the grid carriers 4 carefully cut in points 12. Preferably the carriers 4 are connected together with a suitable sleeve 13 prior to the said operation, so that the grid may now be withdrawn and the filament 3 is freely accessible and may be repaired or replaced by a new one.

After this step has been carried out the grid 5 is brought in position again and its severed carriers 4 connected e. g. by welding or by means of joints 14 (see Fig. 3) into which the severed ends of the carriers are inserted and secured in position by screws 15. The joints are made of suitable material such as molybdenum.

The gap 11, produced by cutting the anode 7 is widened on the outside to obtain a cylindrical shoulder 16 on both parts of the anode, said shoulders having equal diameter. A sealing ring 17, provided with two knife edges is then interposed between the two portions, as disclosed in Ser. No. 730,827. The inner surface of the ring is cylindrical, its diameter being equal to the diameter of the shoulder 16, and the ring 17 exactly centres the two portions of the anode 7 against each other (see Fig. 2). The ring 17 is made of a suitable hard material, preferably steel and its knife edges are hardened, so that when the two portions of the anode 7 are pressed towards each other, e. g. by tightening the clamping screws 18, the knife edges of the ring 17 penetrate into the front surfaces of the severed portions of the anode, providing thus a perfect seal of the connection of the two portions of the anode. The arrangement of the sealing ring 17 and the way in which it is employed are described in the said Ser. No. 730,827. The clamping screws 18, of which only one is shown in the drawing engage beams 19 and 19', of which the beams 19 rest against a flange 20 of the upper portion of the metal anode, and the beams 19', which may, if desired, be replaced by a suitable disc or star, rest against the bottom 8 of the anode, so that in tightening the screws 18 the two portions of the anode are pressed against each other. After the sealing has been completed, the gap, remaining still at the outside of the sealing ring 17, may be filled in by tin or solder 10. In this way the ring is protected and the two portions of the anode mechanically connected freeing this the ring 17 from mechanical strains. The pouring in of the material in the outer gap may, of course, be carried out after the evacuation of the discharge device, if required.

The evacuation of the discharge device, repaired in this way, may be carried out by the method and arrangement disclosed in the said Ser. No. 730,827 and in particular in accordance with Figs. 6 and 7 or, if desired, 8 or 9 of this patent. For making use of this device an aperture 21 is drilled into the cut-away portion of the anode 7, preferably into its bottom 8. Over this aperture the appropriate device mounted on the evacuating tube 23 (see Fig. 4) is placed. The tube is provided at its end with a bell 22 which is applied over the aperture 21 and is provided with two annular knife edges 26 and 27, arranged one inside the other; the outer edge 26 projects slightly over the inner edge 27, the annular space between the two knife edges being connected by means of channels 28 with the bore 23' of the evacuating tube 23, whereas the space, surrounded by the inner knife edge 27 is closed with respect to this bore. After the bell has been brought in position it is depressed by a pressure, generated by a suitable pressure device (not shown) and acting for this purpose for instance on a flange 25 of the bell 22, so that the outer knife edge 27, which is of hard material or hardened, penetrates into the metal of the bottom 8 of the anode, sealing thus perfectly the connection between the bell 22 and anode 8.

The bore 23' of the evacuating tube 23 is connected by means of channels 28 with the annular space between the two knife edges and by the gap underneath the inner knife edge 27 with the space above the aperture 20, leading to the inside of the discharge device, so that the latter may be evacuated, as the said connection of the evacuating tube with the discharge device is perfectly sealed by the knife edge 26. As soon as the desired vacuum has been achieved, the central portion of the bell 22 is depressed, e. g. by means of a pressure generated by a suitable pressure device, acting on a shoulder 29 of the bell, in the direction against the discharge device. The inner knife edge 27 is thus depressed into the bottom 8 of the anode under deformation of the relatively thin wall 33 of the bell above the annular space between the edges 26 and 27. In this way the aperture 21 in the bottom 8 is perfectly and airtightly severed from the bore of the tube 23 and thus also from the outer atmosphere after the tube is cut off, without impairing the vacuum obtained. The tube 23 is then disconnected from the vacuum pump e. g. by cutting. The bell 22 may, if desired, be additionally secured in a mechanical way, e. g. by pouring tin, solder or other suitable material into the space between the two knife edges.

For deforming the bell and depressing the inner knife edge 27 into the bottom 8 of the anode a suitable pressure device is used; said device may be formed e. g. by a beam 35 and clamping screws 36, the ends of which are screwed into the bottom 8 of the anode.

The evacuating device shown, may, of course, be modified in various ways. So for instance it is possible to arrange the inner knife edge on a separate body, inserted into the bell, or one or both knife edges of the bell may be replaced by sealing rings with double edges.

The method of regeneration according to the invention offers inter alia in particular the following advantages:

Any difficult and dangerous operations upon the glass portion of the discharge device are eliminated. The connection and sealing of the severed portions is carried out in cold state, so that the inner system of the discharge device, electrodes and anode are not oxidised and the glass parts are not subject to a dangerous one-sided influence of heat. During evacuation or removing of gases the parts connected together may be subject to any desired thermic strain. If the process is carefully carried out, the inner system of the discharge device is exactly co-axial with other portions. The evacuating aperture may have a relatively large diameter, enabling the vacuum pump to work with its full efficiency so as to considerably shorten the duration of evacuation.

The regeneration may therefore be accomplished in a very simple but perfect way and moreover it is possible to carry out the regeneration in series with excellent result. It is even possible to repeat the regeneration, preferably by cutting the anode in the same place. For this purpose it is only necessary to machine anew the bearing surfaces of the sealing ring.

While I have disclosed the principles of my invention in connection with several embodiments it will be understood that these embodiments are given by way of example only and not as limiting the scope of the invention as set forth in the appended claims.

I claim:

1. In a method for regeneration of electronic discharge devices, the outer vessel including a metal portion in combination, the steps of severing the said metal portion of said outer vessel so as to gain access to the interior of the discharge device; and then after performing work on the interior parts of the discharge device reconnecting the said severed portions of the outer vessel by forcing annular knife edges of a sealing ring made of a material harder than the material of said metal portion into the surfaces of said severed portions.

2. In a method for regeneration of electronic discharge devices, the outer vessel including a metal portion in combination, the steps of severing the said metal portion of said outer vessel so as to gain access to the interior of the discharge device; then after performing work on the interior parts of the discharge device reconnecting the said severed portions of the outer vessel by forcing annular knife edges of a sealing ring made of a material harder than the material of said metal portion into the surfaces of said severed portions; and subjecting the sealing ring to a hardening treatment.

3. In a method for regeneration of electronic discharge devices, the outer vessel including a metal portion in combination, the steps of severing the said metal portion of said outer vessel so as to gain access to the interior of the discharge device; forming shoulders of equal diameter at opposed surfaces of said severed portions; and reconnecting the said severed portions after performing work on the interior parts of the discharge device by forcing annular knife edges of a sealing ring made of a material harder than the material of said metal portion into said cylindrical shoulders.

4. In a method for regeneration of electronic discharge devices, the outer vessel including a metal portion in combination, the steps of severing the said metal portion of said outer vessel so as to gain access to the interior of the discharge device; then after performing work on the interior parts of the discharge device reconnecting the said severed portions of the outer vessel by forcing annular knife edges of a sealing ring made of a material harder than the material of said metal portion into the surfaces of said severed portions; and pouring a metal of relatively low melting point between the severed portions.

5. In a method for regeneration of electronic discharge devices provided with an outer vessel including a metal portion; and with a grid and a grid-carrier in combination, the steps of severing the said metal portion of said outer vessel so as to gain access to the interior of the discharge device severing the said grid carrier in order to permit removal of the grid; then after performing work on the interior parts of the discharge device reconnecting the severed portions of the grid carrier by a joint of a high melting point metal; and reconnecting the severed portions of the outer vessel by forcing annular knife edges of a sealing ring made of a material harder than the material of said metal portion into the surfaces of said severed portions.

6. In a method for regeneration of electronic discharge devices, the outer vessel including a metal portion in combination, the steps of severing the said metal portion of said outer vessel so as to gain access to the interior of the discharge device; then after performing work on the interior parts of the discharge device reconnecting the said severed portions of the outer vessel by forcing annular knife edges of a sealing ring made of a material harder than the material of said metal portion into the surfaces of said severed portions; and forming a bore in said metal portion of said outer vessel and evacuating the said discharge device by attaching any evacuating device over said bore.

7. In a method for regeneration of electronic discharge devices, the outer vessel including a metal portion in combination, the steps of severing the said metal portion of said outer vessel so as to gain access to the interior of the discharge device; then after performing work on the interior parts of the discharge device reconnecting the said severed portions of the outer vessel by forcing annular knife edges of a sealing ring made of a material harder than the material of said metal portion into the surfaces of said severed portions; subjecting the sealing ring to a hardening treatment; forming a bore in said metal portion of said outer vessel; and evacuating the said discharge device by attaching any evacuating device over said bore.

JIŘÍ STIVÍN.

No references cited.